May 12, 1964
G. L. BEERS
3,132,422
DEVICES FOR PROTECTING AND LUBRICATING ELECTRIC SHAVERS
Original Filed Sept. 5, 1957
2 Sheets-Sheet 2
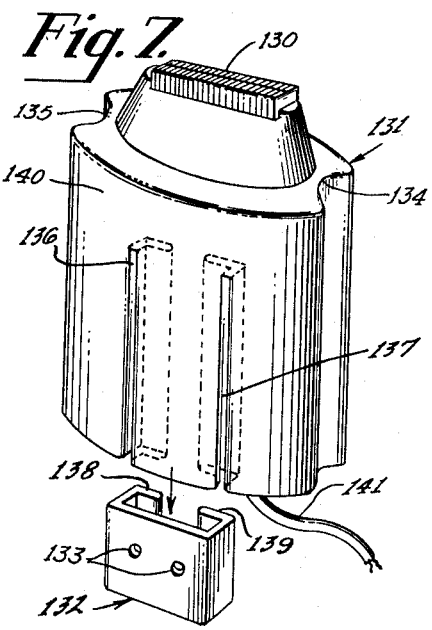
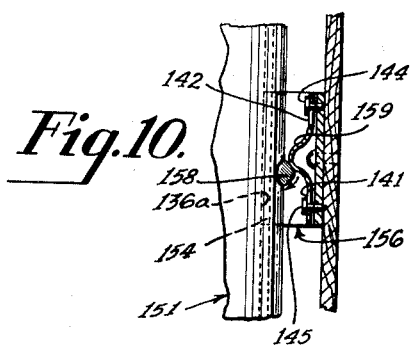
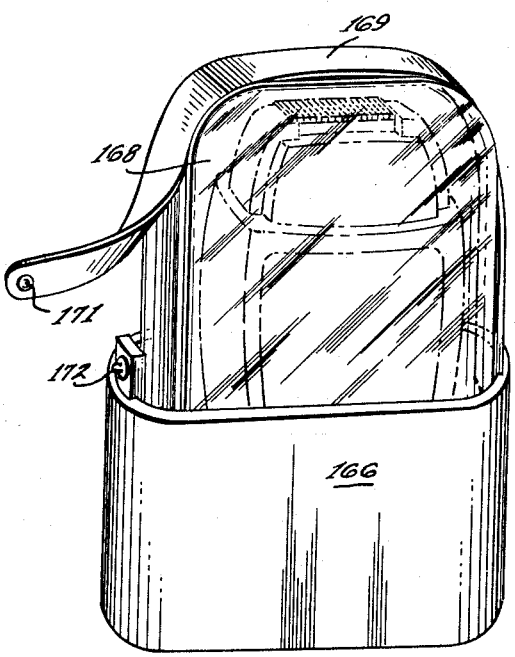
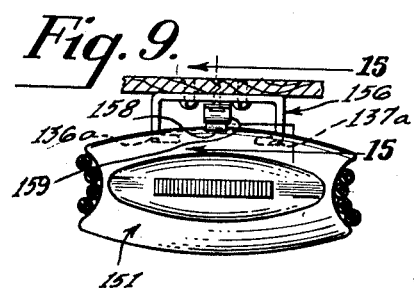
INVENTOR.
George L. Beers
BY
ATTORNEY.

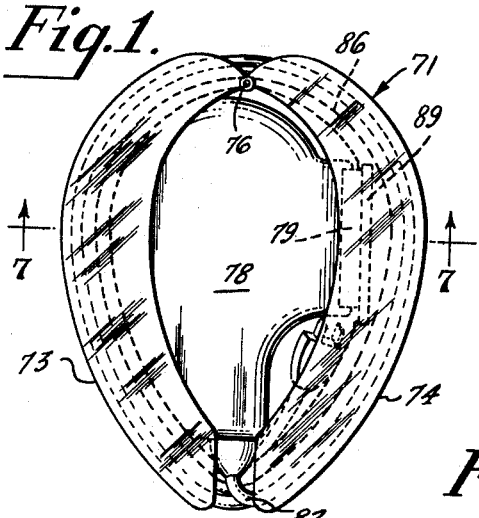
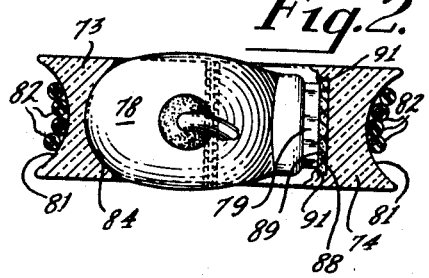
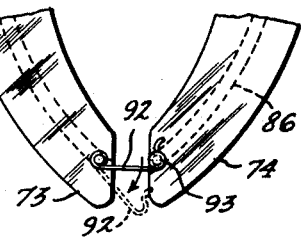
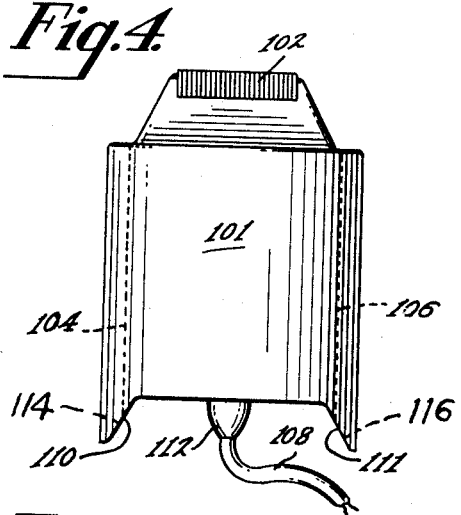
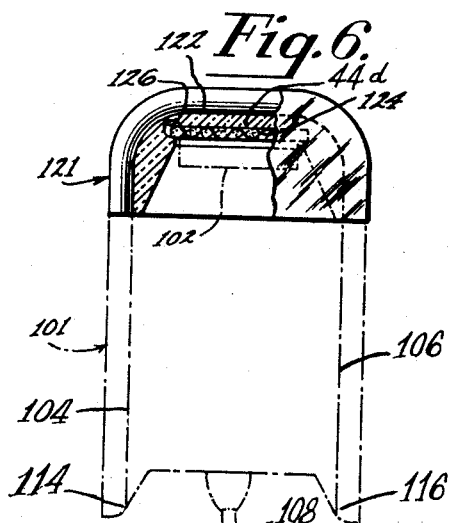
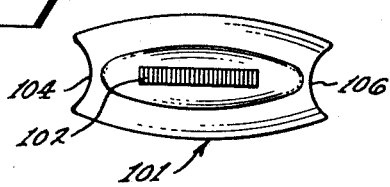

United States Patent Office 3,132,422
Patented May 12, 1964

3,132,422
DEVICES FOR PROTECTING AND LUBRICATING ELECTRIC SHAVERS
George L. Beers, 410 Peyton Ave., Haddonfield, N.J.
Original application Sept. 5, 1957, Ser. No. 682,157, now Patent No. 3,012,109, dated Dec. 5, 1961. Divided and this application Aug. 24, 1961, Ser. No. 133,650
3 Claims. (Cl. 30—34)

The present invention relates to electric shavers and more particularly to arrangements and devices for substantially increasing their convenience of use and improving their performance.

In certain aspects, thereof, the present invention incorporates improvements over features disclosed in Patent No. 2,773,663 granted to me on December 11, 1956.

Three of the problems which contribute to the inconvenience of using electric shavers are, protection of the cutting head, storage of the electric cord and lubrication.

In order to provide a close shave the cutting elements of an electric shaver are made of very thin metal and are consequently liable to damage when subjected to relatively light contact with some foreign object. Replacement of a damaged cutting head for many shavers represents a substantial portion of the total cost of the shaver. It is, therefore, necessary that the cutting head of electric shavers be protected at all times when not in use. Electric shavers are presently provided with a simple plastic or metal guard which is removed prior to shaving. Since this guard is small and fulfills no other function it is frequently misplaced thus leaving the shaver subject to damage.

The electric cord likewise contributes to the inconvenience of using an electric shaver. The packages or cases in which shavers are sold are intended primarily to appeal to the prospective customer's eye rather than provide a convenient means for storing the shaver and cord. These cases are generally so bulky and inconvenient to use that purchasers discard them immediately even though they represent a significant portion of the total cost of the shaver. At home the shaver user has the alternative of purchasing a wall mounting holder for his shaver which may have provision for coiling the cord on a reel or leaving the cord dangling from an outlet and storing the shaver on the shelf of the medicine cabinet in the bathroom.

This application is a division of my copending application Serial No. 682,157 filed September 5, 1957, which has matured into Patent No. 3,012,109 granted December 5, 1961, of the same title.

The majority of electrical appliances used in the home today have the electric cord attached directly to the appliance. This avoids difficulties due to poor connections in plugs and receptacles and makes it impossible to misplace the electric cord. Dut to lack of a convenient means for storing the electric cord, electric shavers are provided with a plug and receptacle so that the electric cord can be disconnected from the shaver. As a result of this arrangement many individuals have found themselves on a trip with an electric shaver but without the electric cord which will enable them to use it. It is an object of the present invention to provide a simple means for storing the electric cord for a shaver which will permit the cord to be connected permanently to the shaver without the usual plug and receptacle. The forgotten cord problem is thereby avoided.

Lubrication plays an important role in obtaining maximum satisfaction from many electric shavers. Electric shavers require moving parts in contact with each other to provide the shearing action. Friction therefore plays an important role in the operation of an electric shaver. Not only does friction slow down the action of the cutting head but it reduces the useful life of the cutting head through increased wear. A drop of oil on one's finger applied to the cutting head of many electric shavers will cause a very noticeable increase in the velocity of the cutting head indicating a substantial reduction in friction in the cutting head.

Some shaver manufacturers recommend that this be done once a week. Very few shaver users follow this recommendation because it is a messy procedure with the possibility of spilling oil on one's clothing, the floor covering or furniture.

Applying oil to the cutting head with the finger is unsatisfactory for another reason. Quite frequently too much oil is applied in this manner with the result that the residue from shaving tends to adhere to the moving parts and in a short time increases friction. Likewise if an excess is applied in this manner some of this excess is deposited on the face when shaving. To obtain optimum performance a very light film of oil should be applied to the cutting head each time the shaver is used.

In accordance with the present invention means are provided whereby the cutting heads of electric shavers are lubricated without any conscious effort on the part of the user. The shaver is lubricated each time it is used and the proper amount of oil is applied to the cutting head without any excess. The possibility of spilling oil on the clothing, furniture or bathroom rug is avoided. The lubricating feature functions equally well at home or traveling and the danger of getting oil on one's luggage or its contents is completely avoided.

In one embodiment of the invention the hollow receptacle and the cutting head of the electric shaver cooperate to form a complete enclosure in which is located the lubricating means in the form of a resilient material impregnated with a suitable lubricant. The surface of the resilient material applies a light film of oil to the cutting head. Since the cutting head and the resilient material containing the lubricant are effectively enclosed in a small compartment within the receptacle, any lubricant which evaporates will be deposited on the cutting head of the shaver and prevented from reaching other portions of the shaver or the electric cord where it may cause damage.

An object of the present invention is to provide for protection of the cutting head, storage of the electric cord, and lubrication of an electric shaver in an improved and novel manner.

Another object of the present invention is to provide a shaver having a novel configuration whereby to accommodate the shaver cord so that it is neatly held and readily accessible.

A further object of the present invention is to provide a novel guard for an electric shaver having means to store the shaver cord in a conveniently accessible manner.

A further object of the present invention is to provide a novel guard for an electric shaver having means to lubricate the cutting head of the shaver.

A still further object of the present invention is to provide a novel combined shaver holding bracket and switch control.

Other objects and advantages of the present invention will, of course, become apparent and immediately suggest themselves to those skilled in the art to which the invention is directed from a reading of the following specification in connection with the accompanying drawing in which:

FIG. 1 is a view in side elevation of a novel electric shaver guard and cord holder of this invention accommodating a well known type of shaver;

FIG. 2 is a view in section on line 7—7 of FIG. 1, as viewed in the direction of the arrows, of the guard and cord holder of FIG. 1;

FIG. 3 is a fragmentary view of a slight modification of the guard and cord holder of FIG. 1;

FIG. 4 is a view in side elevation of an electric shaver constructed to embody features of the present invention;

FIG. 5 is a view in plan of the shaver of FIG. 4;

FIG. 6 is an elevational view, partially in section, of a cutting head guard for the shaver of FIGS. 4 and 5;

FIG. 7 is a view in perspective of a shaver of this invention, similar to the shaver of FIGS. 4 and 5, together with a holding bracket;

FIG. 8 is a view in front elevation of a bracket having a switch operating feature secured to a supporting surface, such as a wall or the like;

FIG. 9 is a view in plan of a shaver and bracket similar to that of FIG. 7;

FIG. 10 is a fragmentary section on line 15—15 of FIG. 9 as viewed in the direction of the arrows; and FIG. 11 is a view in perspective of a separate pouch or case for receiving a shaver carrying case, or shaver and guard combination, for example, the combination shown in FIG. 6.

FIGS. 1, 2 and 3 disclose an electric shaver guard 71 of this invention. It is composed of two parts 73 and 74 hinged at 76. Reference character 78 designates a well known type of electric shaver having the cutting portion or cutting heads 79 disposed laterally of the body of the shaver. Each part of the shaver guard is recessed or grooved as indicated by reference character 81 to accommodate the shaver cord 82. The interior wall of the part 73 is grooved as indicated by reference character 84 so as to provide a proper fit against the case of the shaver 78. The part 74 is provided with a groove 86 similar to the groove 84. The groove 86 is interrupted by a depression 88 at and in the neighborhood of the shaving head 79. The depression 88 accommodates a pad 89. The pad 89 may be formed by enclosing resilient material in a single enclosure of metal, plastic or elastic material like neoprene to form in effect a "stamp pad" containing a lubricant instead of ink. The depression 88 may be undercut as indicated at 91. The hinged guard of FIG. 1 is particularly suitable for shavers which are unsymmetrical. It minimizes the space required to store the shaver and cord and also protects and lubricates the cutting head.

FIG. 3 of the drawing is a fragmentary showing of a shaver guard such as shown in FIG. 1 but provided with a latch member or hook 92. The latter is pivoted on the part 73 and engages a pin 93 on the part 74 to retain the parts in the closed shaver engaging position. The latch 92 is provided where means for securing the parts together are desired in addition to the convolutions of the cord 82.

FIGS. 4, 5 and 6 show a shaver constructed to embody features of the present invention. The shaver is designated by reference character 101 and may have any suitable internal mechanism for operating the cutting head 102. The latter may also be of any known kind effective for performing a shaving operation. The body of the shaver 101 is provided with grooves 104 and 106 so as to accommodate the shaver cord 108. The cord 108 ends in a cord plug or connection 112. The sides of the shaver are extended as indicated by reference characters 110 and 111 so that the end of the cord 108 is protected and also so that the cord will pass across without protrusion by reason of the notches 114 and 116 in the ends 110 and 111. If desired a flexible clip of metal or plastic can be incorporated in or attached to the body of the shaver in the space between the notches 114 and 116 to hold the cord plug firmly in place.

FIG. 6 shows a guard 121. The guard is grooved or recessed as indicated at 122 to accommodate the cord 108 when the guard is fitted to the shaver 101. The guard is so shaped that when attached to the shaver the grooves 104 and 106 are joined together by the groove in the guard to form a continuous groove extending from notch 114 in a clockwise direction to notch 116. The guard may be provided with slight inward projections in the region where it makes contact with the shaver. These projections are arranged to cooperate with corresponding recesses in the body of the shaver to hold the guard in place while the cord is being wound around the groove in the shaver and guard. The inside of the guard is provided with a depression 124. The depression is or may be undercut and is provided with a recess so that pad 44d may be readily removed.

It will be apparent to those skilled in the art that the shape or form of the shaver 101 may be varied and still retain the features of the invention. For example, the ends of the recessed portion of the shaver which are designated 110 and 111 may be curved around the bottom of the shaver so that the recess more nearly encircles the shaver but still leaving an open space for the end of the cord 108 and the plug on the other end after the cord has been wound in the recess. Likewise, a recess can be made in the body of a shaver such as shown in FIG. 1. A guard similar in shape to the part 74 of FIG. 1 can be made with a recess which will cooperate with the recess in the body of the shaver to form a substantially continuous groove around the shaver and guard in which the electric cord can be wound.

The shape of the recess may also be varied as desired. For example, the recess in the shaver of FIG. 4 may be shaped to the outline of a finger or thumb so that the recess may be used to grip the shaver more securely and conveniently when shaving.

FIGS. 7 and 8 show a shaver 131 for use in combination with a bracket 132. The shaver 131 may be similar to the shaver 101 of FIGS. 4 and 6. The shaver 131 is provided with a cutting head 130. The shaver body 140 is provided with inward recesses 134 and 135 similar to the recesses 104 and 106 in FIGS. 4 and 6. A guard such as the guard 121 in FIG. 6 is used to continue the recesses 134 and 135 around a sufficient portion of the shaver body so that the electric cord can be wound therein. The shaver is grooved as indicated at 136 and 137 to be received by the lips 138 and 139 of the bracket 132. The bracket 156 in FIG. 8 is similar to the bracket 132 but includes a switch operator 159. The brackets 132 and 156 may be secured to a surface such as the front of a cabinet or to a wall by means of the screws 143 in FIG. 8 which may pass through holes such as 133 shown in FIG. 7 and the shaver 131 may be conveniently held by the bracket 132 or the bracket 156 when it is not in use. The cord 141 may be accommodated as pointed out previously herein. It will be noted that the grooves for attachment to the mounting bracket are so located with respect to the recess in the body of the shaver that the electric cord can be wound in the recess when the shaver is attached to a wall through the mounting bracket. It will likewise be apparent that the location, shape and size of the grooves in the body of the shaver are such that the grooves 136 and 137 impose no limitations in grasping the shaver while shaving.

FIGS. 8 to 10 disclose a shaver 151 which may be similar to the shavers 101 and 131. The shaver 151 is provided with grooves 136a and 137a to receive the lips 154 and 155 of a bracket 156. The shaver casing has a switch lever 158 projecting therefrom. As the shaver 151 is engaged with the bracket 156 the switch lever is turned to the off position by a switch operator 159. When the shaver is removed the switch lever is returned to the on position. The switch operator 159 is similar to the switch operator 130 of the patent referred to above.

The switch operator 159 is in the form of a U-shaped spring. Slots 141 and 142 are provided near each end of the spring and extend lengthwise between the rivets or screws 144 and 145. These rivets or screws hold the spring in place on the bracket 156, but the slots permit the spring to be compressed as the control switch; for example the switch lever 158 passes the hump in the spring 159. Moving shaver 151 in FIG. 10 in a direction toward the top of the drawing causes the slot 142 to move relative to the screw 144 thus enabling the spring 159 to flatten out so that the switch lever 158 can pass the hump in the spring 159. The stiffness of the spring causes the switch lever 158 to move to the end of its travel in either direction before the spring is compressed to permit the switch lever to move past the spring. Thus the stiffness of the spring in cooperation with the slot 142 and the screw 144 cause the switch lever 158 to be actuated from the "on" position to the "off" position when the electric shaver 151 is placed on the bracket 156. The stiffness of the spring in cooperation with the slot 141 and the screw 145 cause the switch lever 158 to be actuated from the "off" position to the "on" position when the electric shaver 151 is removed from the bracket 156.

FIG. 11 of the drawing shows a pouch or case 166 for receiving a shaver carrying case 168, similar to the case of FIG. 1 in U.S. Patent No. 2,773,663 to which reference has previously been made. The pouch or case 166 is provided with a retaining strap 169 which has a snap fastener button 171 thereon. The button 171 may be engaged with a snap fastener 172 so that the carrying case 168 is held in position with respect to the pouch 166. The retaining strap 169 is of proper width to fit within the outside edges of the recess in the case 168 so that the strap completely covers the convolutions of the electric cord when the cord is wound around the case. The pouch or case 166 as shown, then serves as a closure for the open end of the carrying case 168, or the like. The retaining strap 169 may be provided with an elastic or spring member such as is frequently used on binocular cases so that the strap is kept neatly in place at all times. The spring member may be incorporated in the opposite end of the strap from the button 171 so that it is concealed by the case 166. The carrying case 168 may be of transparent plastic with the result that the details of the shaver are clearly visible yet the cord is hidden from view and all the convenience features previously discussed are retained. It will also be apparent that the case 166 can be employed to advantage with the shaver and guard combination shown in FIGS. 4, 5 and 6.

What is claimed is:

1. An electric appliance having a control switch, a mounting bracket, means on said appliance cooperative with means on said bracket for detachable engagement therewith, said mounting bracket having means for attachment to a rigid support, said bracket provided with means to cooperate with said engaging means of said appliance so that the appliance may be attached through said bracket to said rigid support, and means on said bracket operative to actuate said control switch on said appliance to the "off" position from its "on" position when said appliance is attached through said bracket to said rigid support.

2. An electric appliance having a control switch, a mounting bracket, said appliance having means for detachable engagement with said mounting bracket, said mounting bracket having means for attachment to a rigid support, said bracket provided with means to cooperate with said engaging means of said appliance so that the appliance may be attached through said bracket to said rigid support, means on said bracket operative to actuate said control switch on said appliance to the "off" position from its "on" position when said appliance is attached through said bracket to said rigid support, and means on said bracket operative to actuate said control switch on said appliance to the "on" position from its "off" position when said appliance is removed from said bracket.

3. An electric shaver having a cutting head, a body, an electric cord and having a control switch, said body having an inward recess in at least one side, a guard for the cutting head of said shaver, said guard being shaped on one side to enclose the cutting head of said shaver to protect it from damaging contact with foreign objects, the opposite side of said guard recessed so that the recess in the body of said shaver is effectively continued around the periphery of said shaver when the guard is attached to said shaver, a mounting bracket, the body of said shaver having means for detachable engagement with said mounting bracket, said mounting bracket having means for attachment to a rigid support, said bracket provided wth means to cooperate with said engaging means in the body of said shaver so that the shaver may be attached through said bracket to said rigid support, means on said bracket operative to actuate said control switch on said shaver to the "off" position from its "on" position when said shaver is attached through said bracket to said rigid support, said means in the body of said shaver for detachable engagement with said mounting bracket so located with respect to the recess in the body of said shaver that the electric cord of said shaver can be wound in said recess when said shaver is attached to said rigid support through said mounting bracket.

References Cited in the file of this patent

UNITED STATES PATENTS

| 2,474,899 | Hutt | July 5, 1949 |
| 2,681,164 | Kalfen | June 15, 1954 |
| 2,773,663 | Beers | Dec. 11, 1956 |

FOREIGN PATENTS

| 62,074 | France | June 2, 1955 |
| 177,945 | Austria | Mar. 25, 1954 |